INVENTOR.
EDWARD H. DINGER
BY
HIS ATTORNEY

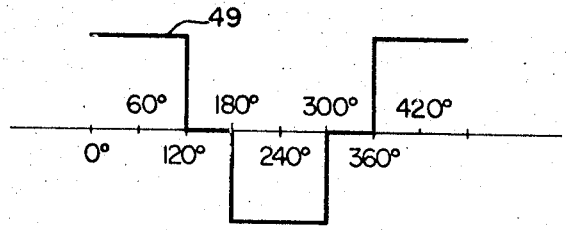
FIG. 4
| TIME | 1SCR | 2SCR | 3SCR | 4SCR | 5SCR | 6SCR | A | B | A-B |
|---|---|---|---|---|---|---|---|---|---|
| 0° | ON | OFF | ON | OFF | ON | OFF | + | − | + |
| 60° | ON | OFF | OFF | OFF | ON | ON | + | − | + |
| 120° | ON | ON | OFF | OFF | OFF | ON | + | + | 0 |
| 180° | OFF | ON | OFF | ON | OFF | ON | − | + | − |
| 240° | OFF | ON | ON | ON | OFF | OFF | − | + | − |
| 300° | OFF | OFF | ON | ON | ON | OFF | − | − | 0 |
| 360° | ON | OFF | ON | OFF | ON | OFF | + | − | + |
| 420° | ON | OFF | OFF | OFF | ON | ON | + | − | + |
FIG. 5
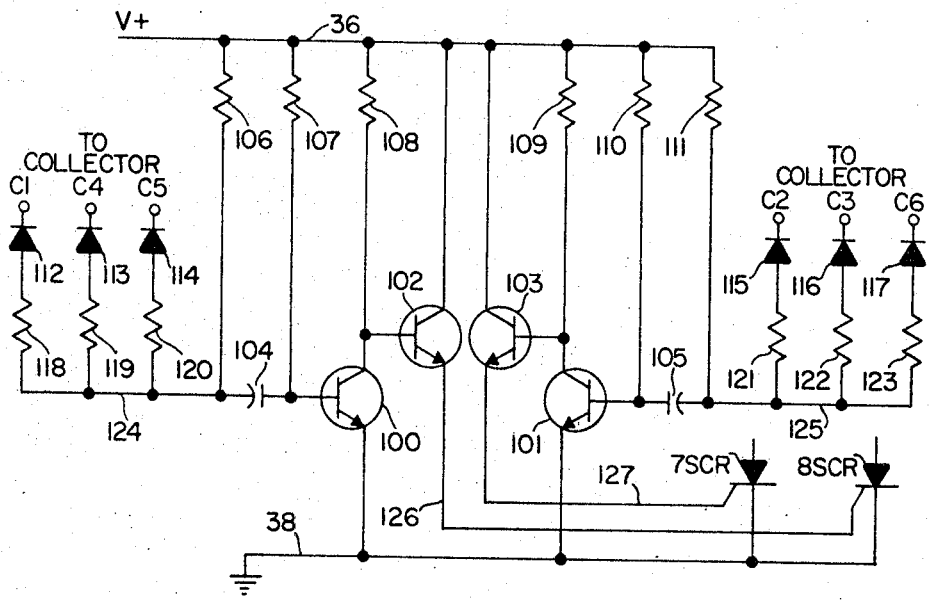
FIG. 7

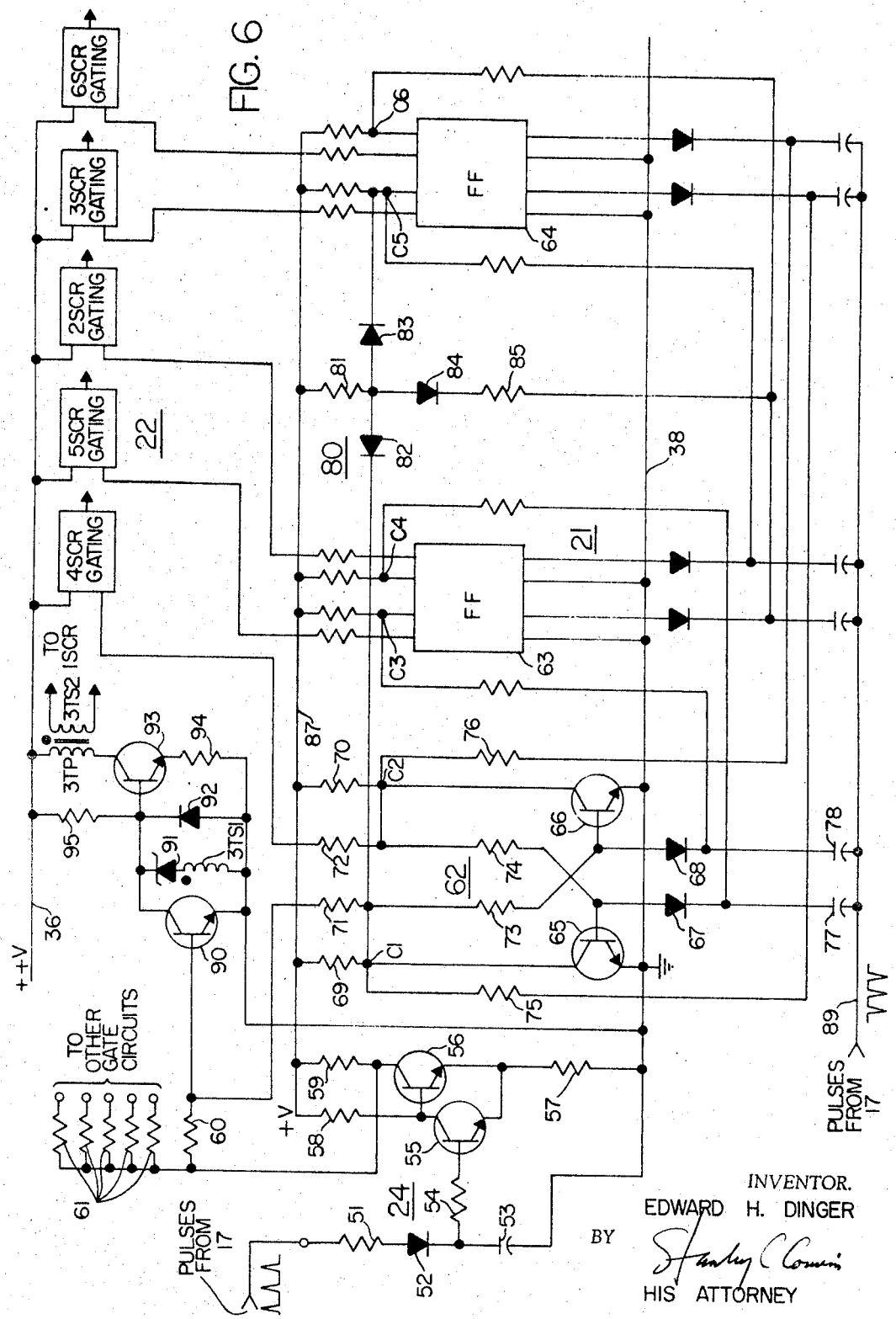

United States Patent Office 3,453,524
Patented July 1, 1969

3,453,524
INVERTER COMMUTATION CIRCUIT
Edward H. Dinger, Waynesboro, Va., assignor to General
Electric Company, a corporation of New York
Filed Jan. 18, 1968, Ser. No. 698,817
Int. Cl. H02m 7/52
U.S. Cl. 321—5                                   18 Claims

ABSTRACT OF THE DISCLOSURE

The commutation circuit disclosed is for the commutation of either half of a fixed or adjustable voltage and frequency SCR inverter. A detection circuit senses which one of the inverter SCR's is to be turned off at the next gating and selects commutation for the appropriate half of the inverter. The commutation circuit includes a pumpback circuit to return excess energy to the source after each commutation.

Background of the invention

This invention relates to silicon controlled rectifier inverter commutation circuits of the type in which more than one silicon controlled rectifier is commutated at one time.

Where the load of an inverter requires an adjustable frequency supply and because of its magnetic properties also requires adjustable voltage, it is found that normal fixed voltage inverter commutation circuits are not appropriate. Ordinarily bridge inverters are autocommutated where the firing of one of the two SCR's in one leg of the bridge causes the commonly coupled inductor for that leg to develop a voltage which reverse biases the second SCR in the leg thereby turning it off. Autocommutation of inverters is impractical when, for example, the load is a motor and it is desired to drive the motor at adjustable speeds. The low voltage amplitude required by the motor at low speeds would be incapable of supporting autocommutation of the inverter SCR's unless the commutation components, i.e., the commutation capacitors and inductors, were of considerable size. At the same time if these commutation components are designed to accommodate low voltages, at the higher frequencies where high voltage is required the extra and unnecessary commutation energy supplied by the commutating capacitors and inductors would cause unnecessary loss of energy and heating of the components. Accordingly, where adjustable frequency and voltage inverters are required, such as in the multiphase frequency control system described in copending application Ser. No. 674,552, filed Oct. 11, 1967 and asigned to the assignee of the present application, there is a requirement that the commutation circuit be capable of accepting wide variations in inverter source voltage without loss of performance or economy.

It is therefore an object of the present invention to provide an economically practical commutation circuit for both fixed voltage and frequency inverters and adjustable voltage and frequency inverters.

Another object of the invention is to provide for inverter commutation circuit which is unaffected by inverter source voltage amplitude change.

Another object is to provide an auxiliary inverter commutation circuit capable of sensing which half of the inverter contains the SCR to be turned off and commutate only that half of the inverter.

A further object is to provide an inverter commutation circuit capable of preserving energy and reducing component heating by returning excess commutation energy to the source.

Summary of the invention

The commutation circuit of the present invention is synchronized by the inverter control circuitry so that commutation is initiated by each change in the conduction pattern of the inverter SCR's. A detecting circuit which senses the particular SCR in the bridge which is to turned off directs commutation to that half of the inverter containing the SCR. The frequency control which initiates the change in the pattern of conducting SCR's also triggers the commutation circuit. Where the inverter is an adjustable voltage and frequency inverter the commutation circuit operates from a separate source of direct voltage which is used to charge a single commutating capacitor. The discharge of this capacitor through one of two switching circuits provides the energy necessary to commutate either half of the bridge inverter. The switching circuits each contain a transformer and a switch device such as an SCR.

The transformer in each capacitor discharge circuit provides not only the coupling to one half of the bridge inverter but provides the inductance necessary to reverse charge the capacitor to commutate the commutating SCR. The commutation circuit also provides a path for coupling commutation energy back to the source to prevent this energy from heating circuit components.

Brief description of the drawings

This invention and the objects thereof will be better understood by reference to the drawings, wherein:

FIGURE 4 is a voltage-time plot of one cycle of one phase of the output of the inverter shown in FIGURE 2;

FIGURE 5 is a table showing the conduction sequence of the SCR's of the inverter shown in FIGURE 2;

FIGURE 6 is a circuit and part block diagram of a time-inhibit circuit, an inverter gating program circuit and an inverter gating circuit for use with the inverter shown in FIGURE 2; and FIGURE 7 is a circuit diagram of a commutation trigger circuit.

Description of the invention

Figure 1:
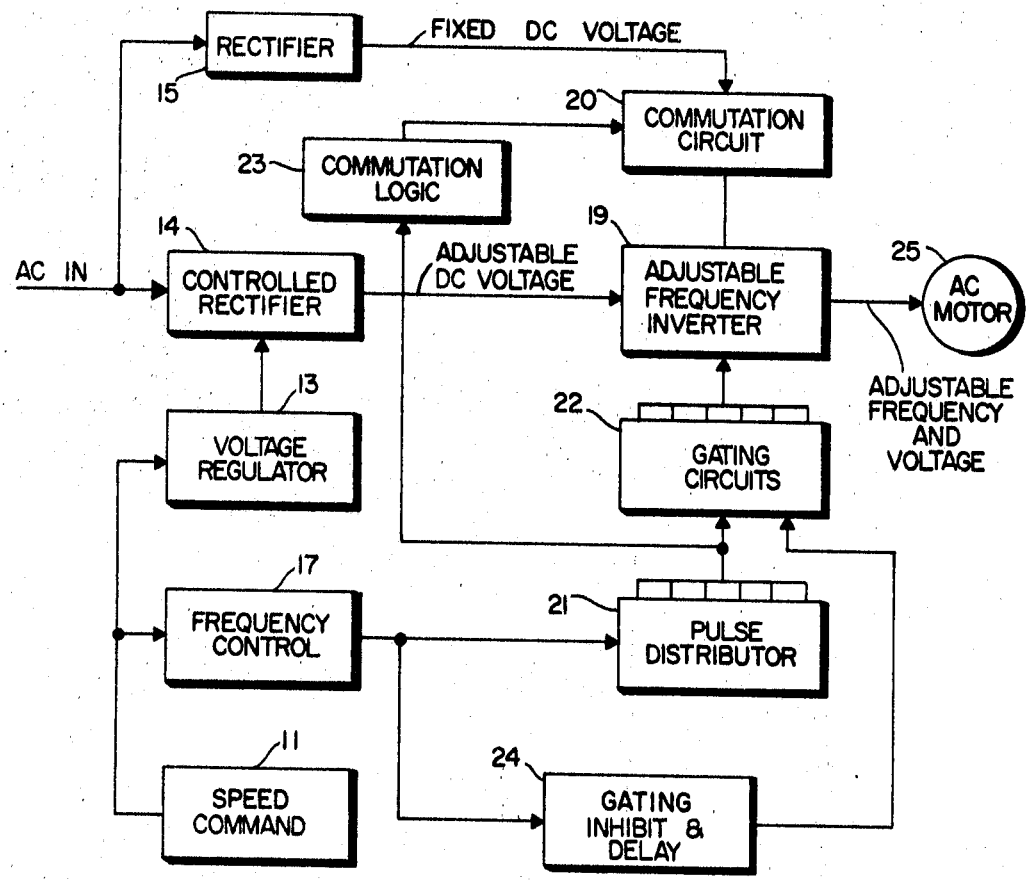
FIGURE 1 is a block diagram of an adjustable frequency and voltage drive for an AC motor utilizing the commutation circuit of the present invention.

FIGURE 1 is a block diagram of an adjustable frequency and voltage inverter drive system for an AC motor. This diagram is substantially similar to FIGURE 1 of the above-mentioned copending application and similar blocks have been numbered similarly. This motor driven system includes a speed command circuit 11 common to both the voltage regulator 13 and the frequency control 17 to adjust both the frequency of inverter SCR firing and the amplitude of the voltage supplied to the inverter 19. The adjustable direct voltage is supplied to the inverter 19 by a controlled rectifier 14 regulated by voltage regulator 13. A source of AC is connected to the input of controlled rectifier 14.

It is to be understood that for the purpose of the present invention the direct voltage source for inverter 19 may be obtained from any suitable source.

FIGURE 1 also shows that a fixed DC voltage is applied to the commutation circuit 20 by rectifier 15 which is also connected to the AC source. The frequency control circuit 17, as described in more detail in the above-mentioned copending application, generates a series of pulses at a rate directly proportional to the desired output frequency of the inverter and supplies these pulses as shown in FIGURE 1 to a pulse distributor 21. This pulse distributor establishes patterns of inverter SCR conduction in programmed sequence and is described more fully with reference to FIGURE 6 below. The output of the pulse distributor is applied to the gating circuits 22 which generate the pulses necessary to fire the inverter SCR's. The system also includes a gating inhibit and delay circuit 24 which is also triggered by the pulses from the frequency control 17. This time-inhibit circuit prevents the gating circuits from being turned on by the outputs of the pulse distributor for a fixed portion of time after each pulse from frequency control 17. The pulse distributor 21 has its output sensed by a commutation logic circuit 23 which directs the commutation circuit 20 to commutate only that half of the inverter which contains the one SCR which is programmed to be turned off.

Throughout the description of the invention both the switch devices in the inverter and in the commutating circuit will be referred to as silicon controlled rectifiers (SCR's). It is to be understood that triacs and other devices of the thyristor type which must be reversed biased to turn off are intended to be included.

Figure 2:
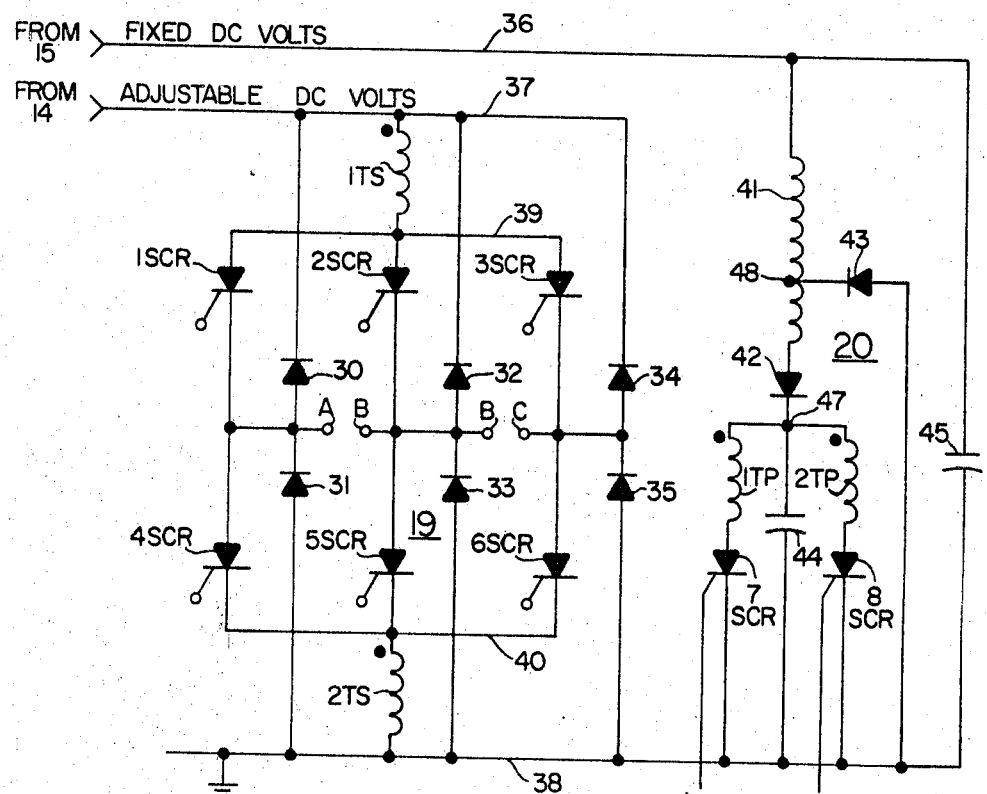
FIGURE 2 is a circuit diagram of a three phase inverter and the preferred embodiment of the commutation circuit.

FIGURE 2 shows a preferred embodiment of the commutation circuit of the present invention and a typical three phase SCR bridge inverter. It should be understood that while a three phase inverter is shown, the commutation circuit can be used with bridge inverters having any number of phases. It is noted that the commutation circuit is supplied with a fixed direct voltage indicated as being from rectifier 15 on line 36 and the inverter is supplied with adjustable direct voltage on line 37 which is indicated as being from the controlled rectifier 14 shown in FIGURE 1. Both the inverter and commutation circuit are shown having a common ground line 38. A capacitor 45 is coupled across the direct voltage supply, i.e., between lines 36 and 38. This is a large capacitor for regulating the source and may constitute part of the voltage source.

The inverter shown in FIGURE 2 is made up of two halves. The first half consists of SCR's 1, 2 and 3, labeled 1SCR, 2SCR and 3SCR. This half of the inverter is connected to the adjustable direct voltage supply line 37 by the secondary winding 1TS of transformer 1T. Also included in the first half of the inverter are reactive load current conducting diodes 30, 32 and 34 which are each connected between the cathode of the respective SCR and the source voltage at line 37. It is noted that the polarity of the voltage supplied on lines 36 and 37 is positive with respect to line 38 and that the diodes 30, 32 and 34 are oriented to provide a return current path from the cathodes of SCR's 1, 2 and 3 to the positive side of the adjustable voltage source.

The second half of the inverter 19 contains SCR's 4, 5 and 6 labeled 4SCR, 5SCR and 6SCR. These SCR's have their cathodes commonly connected to the other polarity of the adjustable voltage source by the secondary winding 2TS of the transformer 2T. Diodes 31, 33 and 35 each connect the anode of the corresponding SCR to the negative polarity side of the adjustable voltage source and serve to conduct reactive load current. Points A, B and C denote the points of the inverter to which the load is connected. Point A is determined by the interconnection of the cathode of 1SCR and the anode of 4SCR and the anode of diode 30 and the cathode of diode 31. Points B and C are obtained from similar interconnections of 2SCR and 5SCR along with diodes 32 and 33 for point B and 3SCR and 6SCR and diodes 34 and 35 for the point C.

Commutation circuit 20 is shown connected across a direct voltage source on lines 36 and 38. It should be understood that the commutation circuit 20 is a practical circuit for use with both adjustable frequency and voltage inverters and fixed frequency and voltage inverters. Thus where the circuit is used with fixed frequency and voltage inverters, the commutation circuit and inverter could be connected to separate sources of fixed direct voltage or both could be connected to the same fixed direct voltage source appearing on lines 36 and 38. It is also noted that in either case, the commutation circuit is supplied by a source of fixed direct voltage, thus in use with an adjustable voltage inverter the commutation circuit is unaffected by inverter source voltage change and in the case of use with a fixed voltage inverter the source for both circuits remains constant.

The commutation circuit includes a commutation capacitor 44 which is charged by the direct voltage source at line 36 via inductor 41 and diode 42. Inductor 41 can be an autotransformer having a tap thereon which is connected to the other polarity of the voltage source through diode 43. Diode 42 is oriented to permit current to flow from the inductor to the capacitor and to prevent the capacitor from discharging back into this inductor. Diode 43 is oriented to permit current to flow from the ground terminal 38 into inductor 41. Inductor 41, diode 42 and the capacitor 44 form a series circuit across the direct voltage source represented by capacitor 45. Connected in parallel with capacitor 44 are two discharge circuits, one being made up by primary winding 1TP of transformer 1T connected in series with silicon controlled rectifier 7SCR. The other discharge path consists of primary winding 2TP of transformer 2T and 8SCR. The secondary windings of each of these transformers serve to connect respective halves of the inverter 19 to the source of adjustable direct voltage.

During a typical commutation cycle current will flow through inductor 41 and diode 42 to charge capacitor 44. If there is no charge on the capacitor 44 at the beginning of the charge cycle, the source voltage initially appears across the inductor 41 and may be called E. When capacitor 44 is charged up to E the energy stored in inductor 41 will keep the current flowing until the capacitor is charged substantially to 2E. Were it not for diode 42, capacitor 44 would discharge back through inductor 41 in an oscillatory mode.

The charge on capacitor 44 is thus preserved until 7SCR or 8SCR is triggered into conductivity by the commutation logic circuit.

Upon the conduction of 7SCR, for example, the voltage on capacitor 44 is applied to the primary winding 1TP of transformer 1T such that a positive voltage appears at the dotted end of this winding and a negative voltage appears at the undotted end. This negative voltage at the undotted end of the primary winding causes a negative voltage to appear at the undotted end of secondary winding 1TS. More specifically, a voltage equal substantially to −2E times the transformer 1T turns ratio is imposed upon the anodes of 1SCR, 2SCR and 3SCR. It is noted that diodes 31, 33 and 35 clamp the cathodes of these SCR's to line 38 so that the voltage applied to secondary winding 1TS, minus the voltage between 37 and 38, reverse biases these SCR's forcing their turnoff. When 8SCR is triggered instead of 7SCR, reverse voltage is applied to 4SCR, 5SCR and 6SCR forcing their turnoff.

When commutation is initiated by the gating on of 7SCR, the current flowing in secondary winding 1TS is transferred to the primary winding 1TP. Adding to this initial current in 1TP is the increasing current resulting from the application of the voltage of capacitor 44 across the inductance of 1TP. Since the current that flows in 1TP is supplied from capacitor 44, capacitor 44 will discharge. As the voltage across capacitor 44 decreases, the voltages across primary winding 1TP and secondary winding 1TS will decrease accordingly. At some point in the discharge of capacitor 44 the net anode-to-cathode voltage across SCR's 1SCR, 2SCR and 3SCR will become positive again. If gating is withheld from SCR's 1SCR, 2SCR and 3SCR at this time they will not conduct and therefore current will not flow in winding 1TS. When the voltage of capacitor 44 reaches zero, current will continue to flow into capacitor 44 from 1TP acting as a voltage source. The voltage on capacitor 44 will therefore not stop at zero but will be taken negative. The capacitor will continue to charge to a negative voltage until the energy in transformer 1T is exhausted and the current goes to zero. The reverse charge on capacitor 44 serves to commutate 7SCR and the commutation circuit enters the capacitor charge cycle again.

The reverse charge on capacitor 44, while beneficial in serving to commutate the commutating SCR's, can have harmful effects. If diode 43 is not in the circuit the negative voltage to which the capacitor 44 can charge could be excessive. In addition this voltage will vary depending upon the level of inverter load current. This results in uncontrolled levels of positive voltage on the capacitor when recharged. Since neither of these conditions are desirable, diode 43 is in the circuit to limit the negative voltage level on the capacitor.

Diode 43 is shown in FIGURE 2 connecting a tap 48 on the inductor 41 to line 38. This connection aids removal of commutation energy in two ways. Diode 43 begins to conduct when capacitor 44 is charged sufficiently negative to pull the tap 48 to ground. When diode 43 conducts the maximum negative voltage on capacitor 44 will be clamped to a value determined by the placement of tap 48. For example, if the tap is at the midpoint of the inductor, autotransformer action will permit the capacitor to charge to −E where E is the voltage of the source on line 36. If the tap is at the one-third point, as shown in the figure, there are twice as many turns of the inductor above the tap as below and the reverse charge on capacitor 44 will held to −½E. With the capacitor charge thus limited the excess energy from the transformer will flow up through diode 43 and divide at the top of the autotransformer 41 according to the turns ratio so that current will flow down through diode 42 back into the dotted end of transformer winding 1TP and also up through the top half of inductor 41 and back into the source. Thus diode 43 lends stability to the commutation circuit by limiting the reverse charge on capacitor 44 and also by returning a portion of the commutation energy to the source prevents excess heating of the elements.

Inductor 41 is selected to have a high impedance compared to the impedance of the inductors 1TP or 2TP to permit only inconsequential current to flow into point 47 during the discharge cycle of the capacitor. This large impedance can present a problem at high frequencies if the charge time is too long to permit the circuit to recover before the next trigger pulse. The inductor 41 has therefore been provided with a saturable core. The core is selected so that at the highest desired operating frequency it will saturated shortly after the commutating SCR has been reset, i.e., at the beginning of the capacitor charge period. Once the core of inductor 41 has saturated, this device has relatively low impedance and capacitor 44 can be charged rapidly. The core is chosen so as not to have a square hysteresis loop so that it is capable of resetting itself upon the complete transfer of energy to the capacitor at the end of the charge cycle.

It has been shown that diode 43 is particularly effective to remove excessive commutation energy by limiting the negative voltage level on the commutating capacitor and by pumping back excessive energy to the source. It is noted that in order to permit diode 43 to effect this energy return, it was necessary to prevent the inverter SCR's from being immediately gated on after commutation. If this were not the case and gating pulses were permitted to be applied to the inverter SCR's, the secondary winding 1TS would carry current at the instant the inverter SCR's are again forward biased. When the capacitor voltage goes below zero, the voltage on the transformer windings accordingly reverses and a circulating path is created by the secondary winding 1TS and the conducting SCR or SCR's and the associated diodes 30, 32 and/or 34. This secondary path of current flow will restrict to a low value the negative voltage to which capacitor 44 can be charged and diode 43 will be rendered ineffective.

It may be desirable in some situations to turn on the inverter SCR's at the same time commutation is initiated or immediately thereafter. If this is the case, an acceptable alternative without energy pump-back is shown in FIGURE 3.

Figure 3:
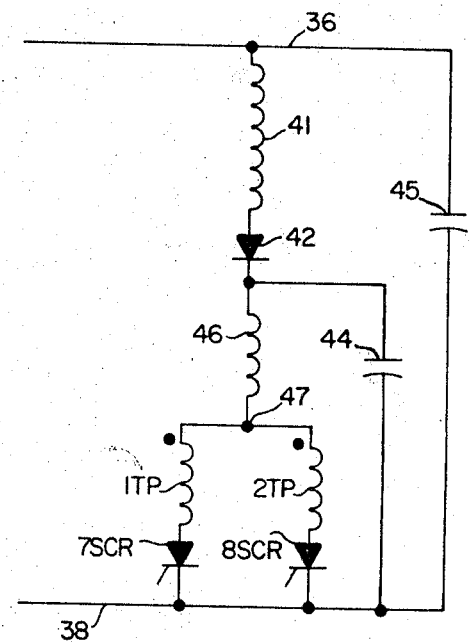
FIGURE 3 is a circuit diagram of another embodiment of the commutation circuit.

FIGURE 3 shows an alternative solution for energy discharge of the commutation circuit. Here an inductor 46 has been added to couple capacitor 44 to the two discharge circuits made up of the primary windings of transformers 1T and 2T and the controlled rectifiers 7SCR and 8SCR. This added inductor receives a portion of the capacitor discharge and thus serves as an additional source of energy aiding the transformers to reverse charge the capacitor during the energy dissipating period. This device insures that the capacitor is sufficiently charged negative to commutate the commutating SCR.

The commutation circuit of the present invention has been described with reference to FIGURES 1, 2 and 3. FIGURES 4–7 of the drawings serve merely to illustrate the relationship between the commutation circuit with the remainder of the inverter control and gating circuitry. With an understanding of how the inverter must work, the commutation of the circuitry of the present invention can be better understood.

One cycle of the voltage output waveform for the inverter is illustrated in FIGURE 4. The stepped waveform shown is preferable to a square wave as it more closely approximates the sine wave desired for inductive loads such as the windings of a motor. With reference to FIGURE 4 and the table of inverter SCR conduction shown in FIGURE 5, a better understanding may be obtained of the genesis of the commutating circuit and the logic circuitry necessary for it to perform properly.

The table shows the states of conduction of each of the SCR's at each point in one cycle of the output voltage and also the voltage polarities which result for the A–B inverter output. The table shows that at zero degrees two SCR's, 1SCR and 3SCR, are conducting in the top half of the inverter and only one SCR, 5SCR, is conducting in the bottom half. At 60°, only 3SCR is conducing in the top row and two SCR's, 5SCR and 6SCR, are conducting in the bottom row. It is noted that for the three phase, six SCR inverter shown, one SCR changes its state of conduction each 60° period throughout the cycle. Thus, one-half of the bridge has two SCR's conducting at each 60° interval and the other half has only one SCR conducting and this condition alternates between halves at each 60°.

The columns of the table labeled A, B and A–B indicate the polarity of the voltage at points A and B depending upon which SCR's of the SCR's 1, 2, 4 and 5 are conducting. At zero degrees 1SCR and 5SCR are conducting and 2SCR and 4SCR are off. Therefore current flows into point A and out of point B and A is plus and B is minus. This is again true at the 60° point. At the 120° point both positive current carrying SCR's are on and both points A and B are positive. Noting the A–B column of the table, it is seen that there is no net current flow into the load. In FIGURE 4 this is seen by the zero voltage level between the 120° and the 180° period.

FIGURES 4 and 5 show that a repetitive pattern of SCR conduction is established in the inverter to produce the desired stepped waveform output for the load. It is this pattern of conduction which must be recognized by the commutation trigger circuit in order to commutate the proper half of the inverter at each 60° point. While the patterns of conduction differ for different inverters having a larger or smaller number of phase outputs, the common characteristic of SCR conduction without regard to phase number is that only one SCR is switched at each trigger point in the cycle of output voltage. Thus only one pair of SCR's top and bottom in one leg of the bridge will be reversed at each point.

Referring again to FIGURE 1 it is seen that the commutation logic circuit 23 receives the output of the pulse distributor 21 which is also applied to the gating circuits for the inverter SCR's. By appropriate detection devices, this commutation logic circuit determines which row of SCR's in the inverter must be commutated with each new conduction pattern.

Referring now to FIGURE 6 there is shown a partial block and partial circuit diagram of the pulse distributor 21 which programs the gating of the SCR's for the inverter 19. The gating circuits 22 for each inverter SCR and the gating inhibit and delay circuit 24 are also shown. The circuits shown in this figure are only examples of circuits of a particular type which can be used to provide the functions of pulse distribution, gating and time-inhibit. The pulse distributor 21 is a ring counter with a logic circuit 80 added to prevent the counter from assuming either of two unwanted states. Logic circuit 80 steers the counter back into one of the six remaining states for proper programming of the inverter SCR's. The ring counter is made up of three flip-flops 62, 63 and 64. Flip-flop 62 is shown in detail and consists of transistor 65 with its input diode 67 and capacitor 77 connecting pulses from the frequency control circuit 17 to the base electrode of this transistor, and transistor 66 with input diode 68 and capacitor 78 connected to its base electrode and to the same source of pulses. The transistors are energized from a source of voltage on line 87 indicated as +V. This voltage is connected to the collector of the transistors by resistors 69 and 70 respectively. Resistors 73 and 74 cross connect the base and collector electrodes of the two transistors to form the flip-flop. The collector C1 of transistor 65 is connected by resistor 71 to the gating circuit for 1SCR and the collector C2 of transistor 66 is connected by resistor 72 to the gating circuit for 4SCR. Each of the collectors C3 through C6 of the transistors in flip-flops 63 and 64 are connected up to the appropriate SCR gating circuit. It can be seen that by use of logic circuit 80 and appropriate steering of the flip-flops, ring counter 21 will progress through the sequence of programs illustrated in the table in FIGURE 5. By controlling the two SCR's in one leg of the inverter by one of the flip-flops in the pulse distributor it is insured that only one SCR in each leg of the inverter will be conducting at any one time. In fact because the pulses from the frequency control for a three phase output system are 60° apart, distributor circuit 21 keeps 1SCR and 4SCR (these SCR's are in the same leg of the inverter) 180° apart in their conduction cycle.

With the required output waveform of the inverter as shown in FIGURE 4 and the required programming of the SCR's for the inverter as set forth in FIGURE 5 for producing this output waveform, the design of the pulse distributor circuit 21 shown in FIGURE 6 reduces to a matter of interconnecting the collectors of the various transistors of the flip-flops to the inputs of the other flip-flops, i.e., selecting the proper steering, to have the flip-flops produce the sequence of patterns shown in FIGURE 5. In FIGURE 6 this steering is indicated by resistor 75 being connected to collector C1 and to the input of the C5 transistor. Resistor 76 is likewise connected to collector C2 and to the input of the C6 transistor. Logic circuit 80, as has been mentioned above, acts as a steering override by inhibiting the counter from assuming the two undesirable state of the eight states possible. Logic circuit 80 is made up of resistor 81, diodes 82, 83, 84 and resistor 85 and overcomes the steering by applying a positive voltage through resistor 81, diode 84 and resistor 85 to the input of the C3 transistor whenever the collectors C1 and C5 are positive. When collectors C1 and C5 are positive and flip-flop 63 is steered to change states with the next pulse, the state of the counter is an undesirable one and the positive pulse from logic circuit 80 overrides this steering result in one of the acceptable patterns being formed. The steering override circuit 80 is ineffective for all other patterns.

Each collector of the pulse distributor 21 is connected to an SCR gating circuit. The collector C1 is shown connected to the input to the gating circuit for 1SCR by resistor 71. This gating circuit is an oscillator which provides a series of pulses whenever transistor 65 is conducting. When transistor 65 is conducting the base of transistor 90 is clamped to near zero volts and this transistor is turned off so that current is no longer drawn away from the base of transistor 93 through resistor 95. Thus when transistor 90 is not conducting transistor 93 will receive the current from resistor 95 and turn on. This creates a positive voltage at the dotted end of transformer primary winding 3TP which appears at the dotted end of secondary winding 3TS1 which is coupled to the base of transistor 93 by the now normal diode acting Zener diode 91. This positive voltage boost at the base causes transistor 93 to regeneratively snap on. The positive voltage appearing at the base 93 occasioned by the secondary winding 3TS1 drives transistor 93 harder until the transformer saturates thereby commanding more collector current than can be supported by the available base current and transistor 93 will turn off permitting the transformer secondary circuit 3TS1 to dissipate the energy stored in the transformer by circulating current up through diode 92 and down through the Zener diode 91. As soon as the transformer comes out of saturation transistor 93 is again forward biased by resistor 95 and it will again be turned on. Thus once transistor 90 is turned off to permit the oscillator 93 to begin oscillations a series of pulses will be present at transformer secondary winding 3TS2 which is connected across the gate cathode junction of 1SCR.

FIGURE 6 also shows a time-inhibit circuit 24. As has been explained it is desirable to prevent the SCR's in the inverter from being triggered on immediately after commutation so that the commutation energy can be pumped back into the source for a short period of time. Thus there is incorporated into the system a gating inhibit circuit such as the one illustrated in FIGURE 6. The same pulses, though of opposite polarity, which trigger the ring counter pulse distributor 21 are shown being supplied to the inhibit circuit 24. These pulses are from the frequency control circuit 17. When a positive pulse is applied to resistor 51 which is in series with diode 52 and capacitor 53, the capacitor is immediately charged up. A positive voltage thus appears on the base of transistor 55 which is turned on to draw current through resistor 58 away from the base of transistor 56 so that transistor 56 snaps off. The collector of transistor 56 rises to a positive value insuring that transistor 90 of the gating circuit is held on preventing any output from the gating circuit. Resistor 60 couples the collector of transistor 56 to the base of transistor 90 of the gating circuit for 1SCR and resistors 61 connect the collector of transistor 56 to each of the other SCR gating circuits.

FIGURE 7 shows one embodiment of the commutation logic circuit 23. This circuit senses which one of the SCR's is programmed to be turned off and triggers the appropriate commutating SCR to commutate the half of the inverter containing that SCR. The circuit shown in FIGURE 7 is one that is particularly adapted for use with the counter shown in FIGURE 6, both of which are used with the three phase inverter shown in FIGURE 2. Diodes 112, 113, 114, 115, 116 and 117 are connected to the collectors C1, C4, C5, C2, C3 and C6 respectively of the flip-flops in pulse distributor 21. Thus the diodes 112, 113 and 114 sense the state of the collectors which are respectively coupled to gate the SCR's 1, 2 and 3 which form the top half of the inverter circuit. Diodes 115, 116 and 117 sense the pulse pattern established by the distributor 21 for the SCR's in the bottom half of the inverter. Each diode in the left half of the detecting circuit is connected by a separate resistor to common line 124. The diodes and these resistors 118, 119 and 120 form an OR gate which is sensitive to negative voltage pulses. A similar OR gate is formed by diodes 115, 116 and 117 and resistors 121, 122 and 123 in the right half of the circuit. The left-hand OR gate is connected to normally conducting transistor 100 by capacitor 104 and the right-hand OR gate is connected to normally conducting transistor 101 by capacitor 105. Transistors 102 and 103 which have their emitters connected respectively to 8SCR and 7SCR are normally not conducting. It should be noted that the right-hand OR gate which senses the conduction pattern of the SCR's in the bottom half of the inverter is connected to 7SCR which, as can be seen by reference to FIGURE 2, commutates the top half of the inverter. By observing one operation sequence of the commutation logic circuit shown in FIGURE 7 this circuit will be better understood.

Assume that the conduction pattern is that shown for zero degrees in FIGURE 5 and that the 60° pulse from the frequency control has just changed the pattern to that shown for 60°. In the top row 1SCR and 3SCR have been conducting and 3SCR is to be turned off. In the bottom row 5SCR has been conducting and 6SCR is to be turned on.

As can be seen from FIGURE 6 the flip-flop having collector C6 is connected to the gating circuit for 6SCR. Thus at the appearance of the 60° pulse the collector C6 will turn on and as can be seen in FIGURE 7 a negative voltage will be coupled through diode 117, resistor 123 and lead 125 to the capacitor 105. At this point the normally conducting transistor 101 will be turned off by this negative pulse and transistor 103 will be turned on to apply a gate pulse to 7SCR. As can be seen from FIGURE 2, 7SCR will commutate the top row of inverter SCR's thus permitting the conducting SCR, 3SCR, to turn off along with 1SCR and 2SCR such that at the 60° pulse 3SCR will remain off leaving only 1SCR conducting from the 60° to 120° period. It is necessary to insure that the pulse which turns off transistor 101 to turn on transistor 103 is only of sufficient duration to trigger 7SCR on. The pulse should be of such short duration that gating is removed from 7SCR before 7SCR again becomes forward biased. Thus capacitor 105 and resistor 110 are provided to insure a short time constant for this pulse. Current through the resistor 110 quickly restores a positive voltage on the base 101 and resistor 111 permits capacitor 105 to charge to the proper level determined by the number of the diodes held down by collectors C2, C3 and C6.

The circuitry shown in the left-hand side of the figure to trigger 8SCR is identical with the circuitry already described for the right-hand portion of this circuit. It is noted that when 6SCR is turned on collector C6 causes a negative pulse to be applied via diode 117 to the base of transistor 101, 3SCR has turned off and C5 produces a positive pulse at diode 114. This positive increment of voltage merely serves if anything to turn transistor 100 on harder and has no effect on the triggering of 8SCR.

While the commutation circuit of the present invention has been described in reference to the particular embodiments of the circuits shown in FIGURES 2 and 3 and its operation explained in regard to its use in a particular system as set forth in FIGURES 1 and 4–7, it is to be understood that the illustrations and specific examples given are only for the purpose of understanding the invention. Many alternatives to the circuits shown are available without deviating from the spirit or scope of the invention. For example, in FIGURE 2, capacitor 144 could be replaced with individual capacitors for each commutating SCR. The three phase system shown is just by way of example. A two phase, six phase or any single or multiphase inverter system could be served by the commutation circuit of the present invention. Where a six phase output is required by the load, two three phase inverters could be used with two commutation circuits or with one commutation circuit having four transformers and commutating SCR's. In addition, while the term silicon controlled rectifier (SCR) has been used throughout the description of the invention, it is to be understood that the commutation circuit of the present invention can be used for the commutation of any thyristor.

What is claimed as new and desired to be secured by Letters Patent of the United States is:

1. A commutation circuit for a bridge inverter of the type having first and second rows of thyristors each coupled between a source of direct voltage and the load, comprising:
   first and second commutating switch devices,
   energy storage means,
   unidirectional current conducting means,
   first inductive means coupled to a source of direct voltage and coupled to said energy storage means by said unidirectional current conducting means for charging said energy storage means,
   second and third inductive means respectively coupling said energy storage means to said first and second switch devices,
   said second and third inductive means being respectively coupled to said first and second rows of said bridge inverter,
   means for selectively triggering said first and second switch devices, such that when said first switch device is triggered into conduction said energy storage means will discharge through said second inductive means to commutate the inverter thyristors in said first row, and when said second switch device is triggered into conduction said energy storage means will discharge through said third inductive means to commutate the inverter thyristors in said second row.

2. A commutation circuit as recited in claim 1 wherein said inverter is an adjustable frequency and voltage inverter,
   the direct voltage source to which said thyristors are coupled is an adjustable voltage source,
   and the direct voltage source to which said first inductive means is coupled is a fixed voltage source.

3. A commutation circuit as recited in claim 1 wherein said inverter is a fixed frequency and voltage inverter and the direct voltage to which said thyristors are coupled is the same source to which said first inductive means is coupled.

4. A commutation circuit as recited in claim 1 wherein said second and third inductive means are first and second transformers each having a primary winding coupling said energy storage means to the corresponding one of said commutating switch devices and a secondary winding,
   the secondary winding of said first transformer coupling the first row of inverter thyristors to one polarity of said first mentioned source of direct voltage,
   and the secondary winding of said second transformer coupling the second row of inverter thyristors to the other polarity of said first mentioned source of direct voltage.

5. A commutation circuit as recited in claim 4 further including fourth inductive means coupled between said energy storage means and the primary windings of said first and second transformers.

6. A commutation circuit as recited in claim 5 wherein said first and second commutating switch devices are thyristors and said fourth inductive means aids the primary winding of the transformer conducting current during the discharge of the energy storage means so that the energy stored by said fourth inductive means and said transformer causes said energy storage means to be reverse charged to commutate the conducting one of the commutating thyristors.

7. A commutation circuit as recited in claim 4 wherein said first inductive means is an autotransformer having a tap intermediate the winding thereof,
   and further including unidirectional current conducting means connecting said tap to the other polarity of the source of direct voltage to which said autotransformer is coupled, the last-named unidirectional current conducting means providing a path to return to the source the energy stored in the transformer which received the last discharge of said energy storage means.

8. A commutation circuit as recited in claim 7 wherein said autotransformer has a saturable core which is driven toward saturation during the discharge of said energy storage means and into saturation at the beginning of the charge cycle of the energy storage means.

9. A commutation circuit for an adjustable frequency and voltage controlled rectifier bridge inverter, comprising:

first and second commutating switches, a capacitor, an inductor coupled to one terminal of a source of direct voltage and to said capacitor to charge said capacitor, a first diode coupling said inductor to said capacitor and oriented to permit current to flow from said inductor to said capacitor, a first transformer having a primary winding coupling said capacitor across the first commutating switch and a secondary winding coupling said bridge inverter to one terminal of a source of adjustable direct voltage, a second transformer having a primary winding coupling said capacitor across the second commutating switch and a secondary winding coupling said bridge inverter to the other terminal of said source of adjustable direct voltage, said inductor, said first diode and the respective parallel paths created by said primary windings with the commutating switches and said capacitor forming a current path across said source of direct voltage, said inductor having a tap intermediate thereof, a second diode, said second diode connecting said tap to the other terminal of said source of direct voltage.

10. A commutation and control circuit for a thyristor bridge inverter comprising:

first and second commutating switches, energy storage means, inductive means coupling said energy storage means to a source of direct voltage to effect the charging thereof, unidirectional current conducting means connected in a series circuit with said energy storage means and inductive means across said source of direct voltage and permitting current to flow from said inductive means to said energy storage means, a first transformer having a primary winding coupling said energy storage means to said first commutating switch in a first discharge circuit and a secondary winding connecting one half of said bridge inverter to one terminal of a source of direct voltage, a second transformer having a primary winding coupling said energy storage means to said second commutating switch in a second discharge circuit and a secondary winding connecting the other half of the bridge inverter to the other terminal of the source of direct voltage, commutation circuit trigger means for selectively triggering said first and second commutating switches, and inverter control means for controlling the conduction sequence of the thyristors in said bridge inverter, said commutation circuit trigger means being coupled to said control means to sense which of the inverter thyristors is programmed to be turned off and triggering said first commutating switch when the thyristor programmed to be turned off is in the first half of said inverter, and triggering said second commutating switch when the thyristor programmed to be turned off is in the second half of said inverter.

11. A commutation and control circuit as recited in claim 10 wherein said commutating switches are thyristors and the energy stored by the transformer which received the energy storage means discharge in turn reverse charges said energy storage means to effect commutation of the conducting commutating thyristor.

12. A commutation and control circuit as recited in claim 11 wherein said inductive means is an autotransformer having a tap intermediate the winding thereof, and further including unidirectional current conducting means connecting said tap to the other polarity of the source of direct voltage to which said autotransformer is coupled, the last-named unidirectional current conducting means providing a path to return to the source the energy stored in the transformer which received the last discharge of said energy storage means.

13. A commutation and control circuit as recited in claim 12 further including frequency control means for determining the frequency of the alternating current output of said inverter, said frequency control means comprising a pulse generator which generates pulses at equal intervals throughout each cycle of said alternating current output, each pulse being coupled to said inverter control means to initiate a change in the pattern of gating pulses applied to the inverter thyristors, and each pulse being coupled to said commutation circuit trigger means to initiate a trigger pulse for one of said commutating thyristors.

14. A commutation and control circuit as recited in claim 13 further including time-inhibit means coupled to said inverter control means and to said frequency control means to delay the application of the gating pulses to said inverter thyristors for a fixed period less than the period between pulses from said frequency control means and commencing with each pulse from said frequency control means, the delay of the application of the gating pulses to the inverter thyristors permitting discharge of the commutation energy stored in the transformer which received the energy storage means discharge so that the energy storage means is reverse charged to commutate the conducting commutating thyristor and permitting the remainder of the energy to be returned to the source via said autotransformer and unidirectional current conducting means.

15. A commutation and control circuit as recited in claim 14 wherein said autotransformer has a saturable core selected to saturate within the period between each pulse generated by said frequency control means for the highest desired output frequency, said core being driven toward saturation at the initiation of commutation, becoming saturated after energy return is completed and being reset by the complete transfer of its energy to said energy storage means at the end of the energy storage means charge cycle, whereby said autotransformer provides low inductance high energy transfer for charging the energy storage means and high inductance low energy transfer during discharge of the energy storage means.

16. A commutation and control circuit as recited in claim 15 wherein said inverter is an adjustable voltage and frequency inverter, the source of direct voltage to which each half of said inverter is connected by said secondary transformer windings is an adjustable voltage source, and the pulses produced by said frequency control means are rate adjustable to produce an adjustable frequency output from said inverter.

17. A commutation and control circuit as recited in claim 1 wherein said inverter is a fixed voltage and frequency inverter, the source of direct voltage to which each half of said inverter is connected by said secondary transformer windings is the same direct voltage source to which said inductive means is coupled.

18. A commutation and control circuit as recited in claim 11 further including an inductor coupling said energy storage means to the primary windings of said first and second transformers so that said inductor forms part of each discharge circuit, said inductor aiding in the reverse charging of said energy storage means after commutation to insure commutation of the conducting commutating thyristor.

References Cited
UNITED STATES PATENTS

| | | | |
|---|---|---|---|
| 3,286,155 | 11/1966 | Corey | 321—45 |
| 3,340,453 | 9/1967 | Bradley et al. | 321—5 |
| 3,331,011 | 7/1967 | Landis | 321—44 |
| 3,354,370 | 11/1967 | Corry et al. | 321—45 XR |
| 3,355,654 | 11/1967 | Risberg | 321—44 |
| 3,384,804 | 5/1968 | Salihi | 321—45 |
| 3,392,318 | 7/1968 | Huntzinger | 321—5 |
| 3,398,350 | 8/1968 | Ruff | 321—5 |

JOHN F. COUCH, *Primary Examiner.*

W. M. SHOOP, JR., *Assistant Examiner.*

U.S. Cl. X.R.

318—227, 231; 321—45